United States Patent
Hasegawa et al.

(10) Patent No.: US 11,214,237 B2
(45) Date of Patent: Jan. 4, 2022

(54) VEHICLE CONTROL APPARATUS, VEHICLE CONTROL METHOD, RECORDING MEDIUM WITH PROGRAM FOR CONTROL RECORDED, AND VEHICLE CONTROL SYSTEM

(71) Applicant: HONDA MOTOR CO., LTD., Tokyo (JP)

(72) Inventors: Satoshi Hasegawa, Wako (JP); Seonghun Lee, Wako (JP); Katsuyasu Yamane, Wako (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/117,515

(22) Filed: Dec. 10, 2020

(65) Prior Publication Data

US 2021/0179022 A1 Jun. 17, 2021

(30) Foreign Application Priority Data

Dec. 17, 2019 (JP) .............................. JP2019-226985

(51) Int. Cl.
| | |
|---|---|
| *B60R 25/31* | (2013.01) |
| *G01S 5/02* | (2010.01) |
| *B60R 25/00* | (2013.01) |
| *H04M 1/72412* | (2021.01) |

(52) U.S. Cl.
CPC ............ *B60R 25/31* (2013.01); *B60R 25/002* (2013.01); *G01S 5/02* (2013.01); *H04M 1/72412* (2021.01)

(58) Field of Classification Search
CPC . B60R 25/002; B60R 25/2036; B60R 25/209; B60R 25/24; B60R 25/245; B60R 25/248; B60R 25/31; B60R 2325/101; G01S 5/02; H04M 1/72412

See application file for complete search history.

(56) References Cited

U.S. PATENT DOCUMENTS

2018/0265040 A1\* 9/2018 Nowottnick ............ B60R 25/04

FOREIGN PATENT DOCUMENTS

JP 2014-054902 3/2014

\* cited by examiner

*Primary Examiner* — Orlando Bousono
(74) *Attorney, Agent, or Firm* — Rankin, Hill & Clark LLP

(57) ABSTRACT

A vehicle control apparatus includes a vehicle communication control unit performing communication with a mobile terminal, a distance measuring unit measuring a vehicle-terminal distance, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance is satisfied while the distance measurement repeat processing is being executed, finishing execution of the distance measurement repeat processing or increasing intervals of measurements of the vehicle-terminal distance in the distance measurement repeat processing.

8 Claims, 4 Drawing Sheets

VEHICLE CONTROL APPARATUS, VEHICLE CONTROL METHOD, RECORDING MEDIUM WITH PROGRAM FOR CONTROL RECORDED, AND VEHICLE CONTROL SYSTEM

INCORPORATION BY REFERENCE

The present application claims priority under 35 U.S.C. § 119 to Japanese Patent Application No. 2019-226985 filed on Dec. 17, 2019. The content of the application is incorporated herein by reference in its entirety.

BACKGROUND OF THE INVENTION

Field of the Invention

The present invention relates to a vehicle control apparatus, a vehicle control method, a recording medium with program for control recorded, and a vehicle control system.

Description of the Related Art

Conventionally, a vehicle control system has been proposed that includes a security device and an interior reader/writer in a vehicle and thus enables operations on the vehicle by using a vehicle key and a mobile terminal such as a smartphone (see Japanese Patent Laid-Open No. 2014-54902, for example). In the vehicle control system, the security device permits locking/unlocking of a door with the vehicle key if authentication of the vehicle key is succeeded within a communication area outside of the vehicle. The security device further permits to start an engine of the vehicle with the vehicle key if the authentication of the vehicle key is succeeded within a communication area within the vehicle.

The interior reader/writer permits operations on the vehicle (such as locking/unlocking of a door, and start of the engine) with the mobile terminal carried onto the vehicle if authentication via near field communication (NFC) with the mobile terminal is succeeded.

Although the operations on a vehicle with a mobile terminal are enabled when the mobile terminal is carried onto the vehicle in the conventional vehicle control system, enabling operations on the vehicle from outside of the vehicle with the mobile terminal like a vehicle key is also desired. With respect to a vehicle key, operations on a vehicle with the vehicle key can be permitted based on a distance between the vehicle and the vehicle key measured with relatively low power consumption achieved by a combination of low-frequency (LF) and ultra-high frequency (UHF). Therefore, also in order to enable operations on a vehicle from outside of the vehicle with a mobile terminal, enabling measurement of a distance between the vehicle and the mobile terminal with reduced power consumption is desirable.

The present invention has been made in view of such background, and it is an object of the present invention to provide a vehicle control apparatus, a recording medium with program for control recorded, and a vehicle control system that enable measurement of a distance between a vehicle and a mobile terminal with reduced power consumption.

SUMMARY OF THE INVENTION

As a first aspect for achieving the object, there is provided a vehicle control apparatus including a vehicle communication control unit, performing communication with a mobile terminal used by a user of a vehicle when the mobile terminal positions within an out-vehicle communication area within a predetermined distance from the vehicle, a distance measuring unit measuring a vehicle-terminal distance, the vehicle-terminal distance being a distance between the vehicle and the mobile terminal, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance measured by the distance measuring unit is satisfied while the distance measurement repeat processing is being executed, finishing execution of the distance measurement repeat, processing by the distance Measuring unit or increasing intervals of measurements of the vehicle-terminal distance in the distance measurement repeat processing.

In the vehicle control apparatus, the distance measurement control unit may start the distance measurement repeat processing causing the distance measuring unit to measure the vehicle-terminal distance at predetermined time intervals when communication is established between the mobile terminal and the vehicle communication control unit.

In the vehicle control apparatus, as the predetermined condition, a first predetermined condition may be set, the first predetermined condition being that an increase in distance in a plurality of the vehicle-terminal distances measured by the distance measuring unit at different points in time is equal to or higher than a first predetermined value.

In the vehicle control apparatus, as the predetermined condition, a second predetermined condition may be set, the second predetermined condition being that a change in distance in a plurality of the vehicle-terminal distances measured by the distance measuring unit at different points in time is equal to or lower than a second predetermined value.

The vehicle control apparatus may further include a battery remaining-amount recognizing unit recognizing a remaining amount of a battery provided in the vehicle. In this case, as the predetermined condition, a third predetermined condition may be set, the third predetermined condition being that the remaining amount of the battery recognized by the battery remaining-amount recognizing unit is equal to or lower than a predetermined amount.

As a second aspect for achieving the object, there is provided a vehicle control method to be executed by a vehicle control apparatus performing communication with a mobile terminal used by a user of a vehicle, the method including a vehicle communication control step of performing communication with the mobile terminal when the mobile terminal positions within an out-vehicle communication area within a predetermined distance from the vehicle, a distance measuring step of measuring a vehicle-terminal distance, the vehicle-terminal distance being a distance between the vehicle and the mobile terminal, a distance measurement control step of executing distance measurement repeat processing causing the distance measuring step to repeatedly measure the vehicle-terminal distance when communication between the mobile terminal and the vehicle is established by the vehicle communication control step, and a distance measurement continuation determining step of, if a predetermined condition based on the vehicle-terminal distance measured in the distance measuring step is satisfied while the distance measurement repeat processing is being executed, finishing execution of the distance measurement repeat processing by the distance measuring step or increasing intervals of measurements of the vehicle-terminal distance in the distance measurement repeat, processing.

As a third aspect for achieving the object, there is provided a recording medium with a program for control recorded, the program being executed by a vehicle control apparatus performing communication with a mobile terminal used by a user of a vehicle and causing the vehicle control apparatus to function as a vehicle communication control unit performing communication with the mobile terminal when the mobile terminal positions within an out-vehicle communication area within a predetermined distance from the vehicle, a distance measuring unit measuring a vehicle-terminal distance, the vehicle-terminal distance being a distance between the vehicle and the mobile terminal, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance measured by the distance measuring unit is satisfied while the distance measurement repeat processing is being executed, finishing execution of the distance measurement repeat processing by the distance measuring unit or increasing intervals of measurements of the vehicle-terminal distance in the distance measurement repeat processing.

As a fourth aspect for achieving the object, there is provided a vehicle control system including a vehicle control apparatus having a vehicle communication control unit and a mobile terminal used by a user of a vehicle, wherein the vehicle communication control unit and the mobile terminal perform communication by establishing communication with each other when the mobile terminal positions within an out-vehicle communication area of the vehicle communication control unit, and the vehicle control apparatus includes a distance measuring unit measuring a vehicle-terminal distance, the vehicle-terminal distance being a distance between the vehicle and the mobile terminal, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance measured by the distance measuring unit is satisfied while the distance measurement repeat processing is being executed, finishing execution of the distance measurement repeat processing by the distance measuring unit or increasing intervals of measurements of the vehicle-terminal distance in the distance measurement repeat processing.

According to the above-described vehicle control apparatus, if a predetermined condition is satisfied when communication between the mobile terminal and the vehicle communication control unit is established and while the distance measurement repeat processing is being executed by the distance measurement control unit, the distance measurement repeat processing is finished or the intervals of the measurements of the vehicle-terminal distance in the distance measurement repeat processing is increased by the distance measurement continuation determining unit. Thus, the power consumption required for measurements of the distances between the vehicle and the terminal can be reduced more than a case where the distance measurement repeat processing is unconditionally continued when the communication between the mobile terminal and the vehicle communication control unit is established.

DETAILED DESCRIPTION OF THE PREFERRED EMBODIMENT

Figure 1:
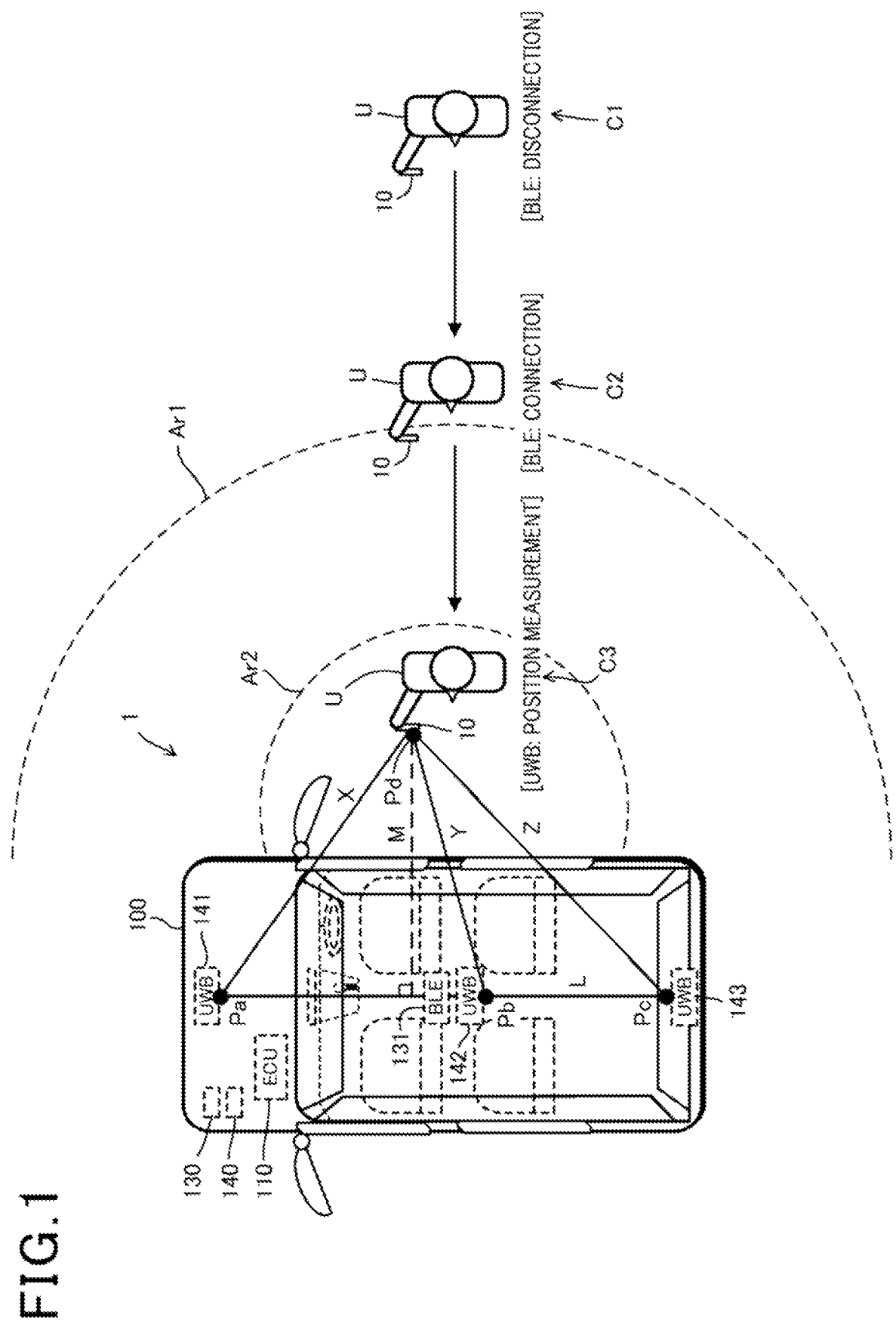
FIG. 1 is an explanatory diagram of an aspect in which a distance between a vehicle and a mobile terminal is measured by a vehicle control system.

1. Measurement of Distance Between Vehicle and Mobile Terminal by Vehicle Control System With reference to FIG. 1, an aspect is described in which a distance (hereinafter, "vehicle-terminal distance") M between a vehicle 100 and a mobile terminal 10 is measured in a vehicle control system 1 of an embodiment. The vehicle control system 1 includes an ECU 110 (corresponding to a vehicle control apparatus of the present invention) mounted on the vehicle 100 and the mobile terminal 10 used by a user U of the vehicle 100. In order to permit a remote operation on the vehicle 100 with the mobile terminal 10, the vehicle control system 1 measures the vehicle-terminal distance M. The mobile terminal 10 is, for example, a smartphone, a mobile phone, a tablet terminal, or a wearable device such as a smart watch and is carried or worn by the user U for use.

An electronic key application (app) is installed in the mobile terminal 10, and the mobile terminal 10 can function as an electronic key including a function that remotely operates the vehicle 100 by executing the electronic key app. The vehicle 100 and the mobile terminal 10 mutually perform communication by communication specifications of Bluetooth Low Energy (BLE where Bluetooth is a registered trademark) and Ultra Wide Band (UWB). In UWB communication, a band of 500 MHz to ten-odd GHz (such as around an 3 GHz band) is used.

The vehicle 100 includes the electronic control unit (ECU, corresponding to the vehicle control apparatus of the present invention) 110 controlling operations of the vehicle 100, a first vehicle communication unit 130 performing communication by BLE, and a second vehicle communication unit 140 performing communication by UWB.

The vehicle 100 has a BLE antenna 131 connected to the first vehicle communication unit 130 and UWB antennas 141, 142 and 143 connected to the second vehicle communication unit 140. The BLE antenna 131 is arranged substantially in a center part of the vehicle 100. The UWB antenna 141 is arranged in a front part of the vehicle 100, the UWB antenna 142 is arranged in the center part of the vehicle 100, and the UWB antenna 143 is arranged in a rear part of the vehicle 100.

The ECU 110 performs polling by BLE communication through the first vehicle communication unit 130, and, when the mobile terminal 10 enters from outside (the state indicated by C1) to inside (the state indicated by C2) of an out-vehicle communication area Ar1 of BLE communication by the first vehicle communication unit 130, establishes communication by BLE with the mobile terminal 10 within the out-vehicle communication area Ar1.

The ECU 110 confirms that the mobile terminal 10 is registered as an electronic key of the vehicle 100 by performing authentication of the electronic key between the ECU 110 and the mobile terminal 10. More specifically, the ECU 110 confirms that the mobile terminal 10 is registered as an electronic key of the vehicle 100 by comparing an authentication code transmitted from the mobile terminal 10 and an authentication code saved in a memory of the ECU 110.

The ECU 110 measures the vehicle-terminal distance M in order to permit use of the mobile terminal 10 as an electronic key. The ECU 110 performs UWB communication through the second vehicle communication unit 140 with the mobile terminal 10 and measures a distance X between the UWB antenna 141 and the mobile terminal 10, a distance Y between the UWB antenna 142 and the mobile terminal 10, and a distance Z between the UWB antenna 143 and the mobile terminal 10 based on Time of Flight (ToF). Because a position Pa of the UWB antenna 141, a position Pb of the UWB antenna 142 and a position Pc of the UWB antenna 143 in the vehicle 100 are known, a relative position Pd of the mobile terminal 10 with respect to the vehicle 100 is calculated by trilateration by measuring X, Y and Z, and the vehicle-terminal distance M can thus be measured.

When communication by BLE is established between the first vehicle communication unit 130 and the mobile terminal 10, the ECU 110 executes distance measurement repeat processing which repeats measurement of the vehicle-terminal distance M by UWB communication. When the ECU 110 recognizes that, the mobile terminal 10 has entered a monitoring area Ar2 near the vehicle 100, the ECU 110 permits use of the mobile terminal 10 as the electronic key.

Thus, the user U can unlock and lock a door of the vehicle 100, open and close an electric door (such as a power slide door, a power hinge door or a power tail gate), start the engine, turn on/off an air conditioner, and cause a buzzer to go off, for example, by operating the mobile terminal 10. When the ECU 110 recognizes that the mobile terminal 10 has entered the monitoring area Ar2, the ECU 110 performs processing for, for example, putting on a welcome light (not shown) included in the vehicle 100.

When the ECU 110 recognizes that a predetermined condition, which is described below, is satisfied based on a state of measurement of the vehicle-terminal distance M by the distance measurement repeat processing, the ECU 110 finishes the distance measurement repeat processing to reduce power consumption by the vehicle 100 involved in the measurement of the vehicle-terminal distance M.

2. Configuration of Vehicle

Figure 2:
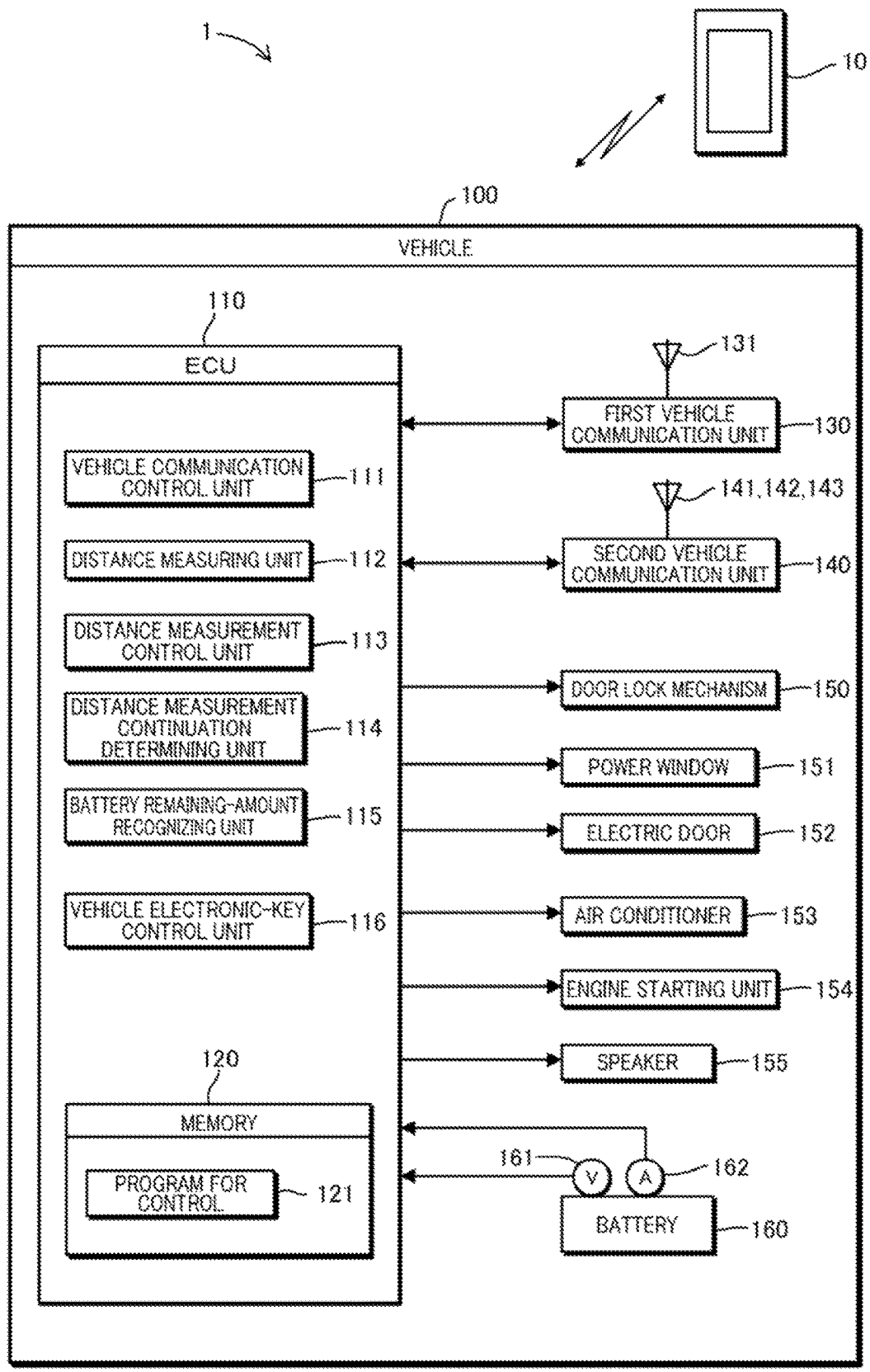
FIG. 2 is a configuration diagram of a vehicle on which a vehicle control apparatus is mounted.

With reference to FIG. 2, a configuration of the vehicle 100 is described. The vehicle 100 includes, in addition to the ECU 110, the first vehicle communication unit 130 and the second vehicle communication unit 140 described above, a door lock mechanism 150, a power window 151, an electric door 152 (such as a power slide door, a power hinge door or a power tail gate), an air conditioner 153, an engine starting unit 154, a speaker 155, and a battery 160.

The battery 160 provides power supply to the ECU 110, the first vehicle communication unit 130, the second vehicle communication unit 140, and so on. The battery 160 has a voltage sensor 161 that detects inter-terminal voltage in the battery 160 and a current sensor 162 that detects input and output currents of the battery 160.

The ECU 110 is a control unit including a central processing unit (CPU), not shown, a memory 120 (recording medium) and so on. The CPU reads and executes a program for control 121 for the vehicle 100 saved in the memory 120 to function as a vehicle communication control unit 111, a distance measuring unit 112, a distance measurement control unit 113, a distance measurement continuation determining unit 114, a battery remaining-amount recognizing unit 115, and a vehicle electronic-key control unit 116. The program for control 121 may be recorded in an external recording medium (flash memory, magnetic disk, optical disk or the like), and transferred from the external recording medium to the memory 120.

Processing to be executed by the vehicle communication control unit 111 corresponds to a vehicle communication control step in a vehicle control method of the present invention, and processing to be executed by the distance measuring unit 112 corresponds to a distance measuring step in the vehicle control method of the present invention. Processing to be executed by the distance measurement control unit 113 corresponds to a distance measurement control step in the vehicle control method of the present invention, and processing to be executed by the distance measurement continuation determining unit 114 corresponds to a distance measurement continuation determining step in the vehicle control method of the present invention.

The vehicle communication control unit 111 performs control over BLE communication through the first vehicle communication unit 330 and performs control over UWB communication through the second vehicle communication unit 140. The distance measuring unit 112 measures the vehicle-terminal distance M by performing UWB communication with the mobile terminal 10 through the second vehicle communication unit 140 as described above with reference to FIG. 1.

When communication by BLE is established between the first vehicle communication unit 130 and the mobile terminal 10, the distance measurement control unit 113 executes the distance measurement repeat processing that causes the distance measuring unit 112 to repeatedly measure the vehicle-terminal distance M. The battery remaining-amount recognizing unit 115 recognizes the remaining amount (residual accumulated electrical amount) of the battery 160 based on the integrated quantity of input and output currents of the battery 160 detected by the current sensor 162, output voltage of the battery 160 detected by the voltage sensor 161 and so on.

While the distance measurement repeat processing is being executed by the distance measurement control unit 113, the distance measurement continuation determining unit 114 determines whether the following first to third predetermined conditions are satisfied or not.

First predetermined condition: The amount of distance increase in a plurality of vehicle-terminal distances M measured at different points in time by the distance measuring unit 112 is equal to or higher than a first predetermined value. The different points in time are measurement points in time of two or more serial vehicle-terminal distances M in the distance measurement repeat processing. When the vehicle-terminal distance M increases by an amount equal to or higher than the first predetermined value, it corresponds to a state that the user U is moving away from the vehicle 100, and it is therefore presumed that there is a low possibility that the user U uses the vehicle 100.

Second predetermined condition: A change in a plurality of vehicle-terminal distances M measured at different points in time by the distance measuring unit 112 is equal to or lower than a second predetermined value. When a change in the vehicle-terminal distances M is equal to or lower than the second predetermined value, it corresponds to a state that the user U is not moving, and it is therefore presumed that there is a low possibility that the user U uses the vehicle 100.

Third predetermined condition: The remaining amount of the battery 160 recognized by the battery remaining-amount recognizing unit 115 is equal to or lower than a predetermined amount. When the remaining amount of the battery 160 is equal to or lower than a predetermined level, the remaining amount of the battery 160 can be kept by limiting the measurement of the vehicle-terminal distances M. When the measurement of the vehicle-terminal distance M is stopped, the user U may touch a touch sensor (not shown) provided on a door handle of the vehicle 100 so that authentication between the mobile terminal 10 and the vehicle 100 is performed and that the use of the mobile terminal 10 as the electronic key is permitted.

If at least any one of the first to third predetermined conditions described above is satisfied, the distance measurement continuation determining unit 114 stops the distance measurement repeat processing by the distance measurement control unit 113. Thus, when it is presumed that there is a low possibility that the user U uses the vehicle 100 or when the remaining amount of the battery 160 is low, the measurement; of the vehicle-terminal distance M is stopped so that the power consumption required for the communication of the vehicle-terminal distances M can be reduced.

Instead of the stopping of the distance measurement repeat processing, the power consumption required for measurements of the vehicle-terminal distances M may be reduced by increasing the intervals between the measurements of the vehicle-terminal distance M in the distance measurement repeat processing and reducing the frequency of the measurement of the vehicle-terminal distance M.

When the mobile terminal 10 positions in the monitoring area Ar2 (see FIG. 1) within the out-vehicle communication area Ar1 of the first vehicle communication unit 130, the vehicle electronic-key control unit 116 performs the authentication processing with the mobile terminal 10 and permits the use of the mobile terminal 10 as the electronic key.

3. Processing of Continuation of Measurement of Vehicle-Terminal Distance

Figure 3:
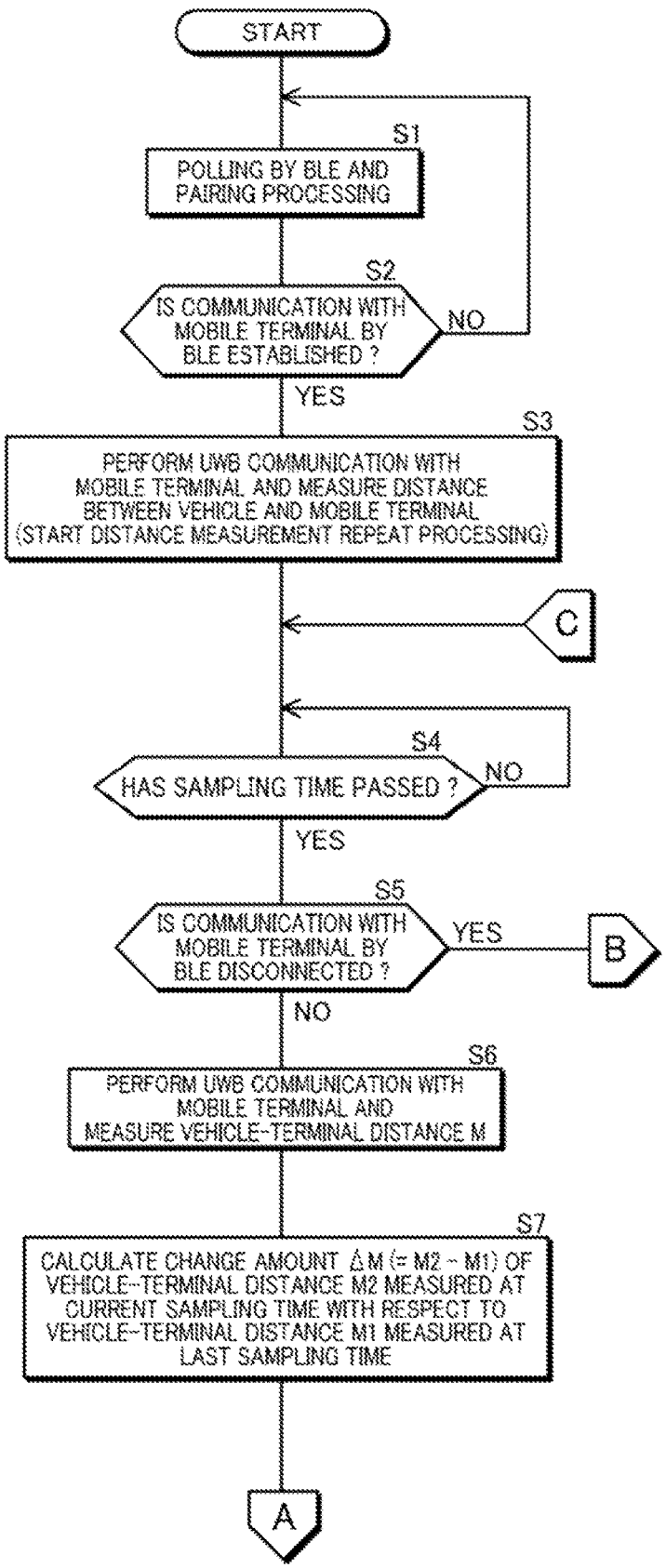
FIG. 3 is a first flowchart of processing of continuing measurement of a vehicle-terminal distance.
Figure 4:
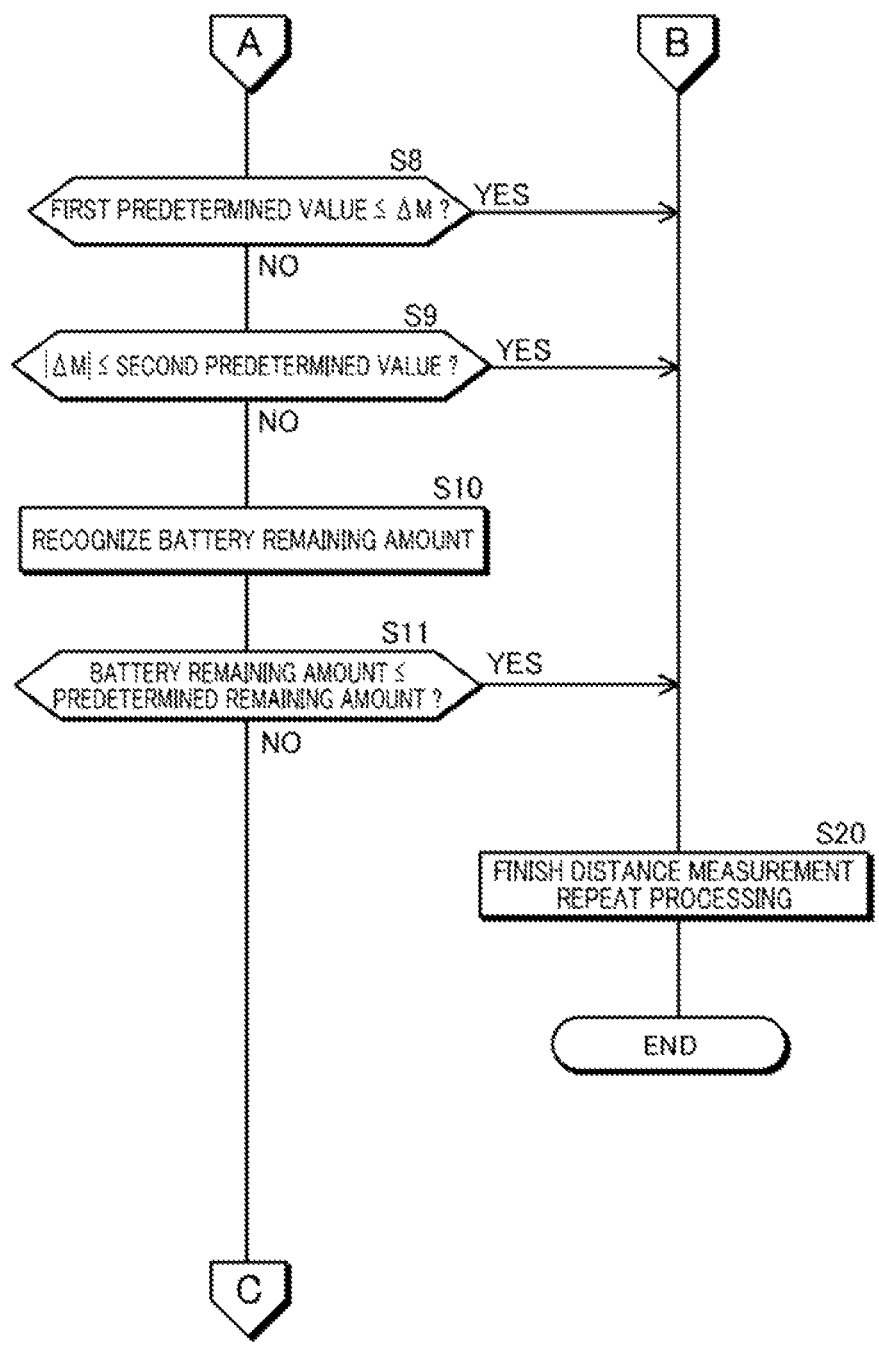
FIG. 4 is a second flowchart of distance measurement repeat processing.

With reference to flowcharts shown in FIGS. 3 and 4, processing of continuation of the measurement of a vehicle-terminal distance to be executed by the ECU 110 is described.

In step S1 in FIG. 3, the vehicle communication control unit 111 performs polling by BLE and performs pairing processing with the mobile terminal 10 positioning within the out-vehicle communication area Ar1 (see FIG. 1) of the first vehicle communication unit 130. In the subsequent step S2, when communication with the mobile terminal 10 by BLE is established by the pairing processing with the mobile terminal 10, the vehicle communication control unit 111 advances the processing to step S3.

The vehicle communication control unit 111 transmits a polling signal through the first vehicle communication unit 130, receives, through the first vehicle communication unit 130, a response signal transmitted from the mobile terminal 10 having received the polling signal, thus detects the mobile terminal 10 and performs pairing with the mobile terminal 10. As the procedure of the pairing, the polling signal may be transmitted from, the mobile terminal 10, and a response signal, transmitted from the vehicle 100 having received the polling signal may be received by the mobile terminal 10 to perform pairing between the vehicle 100 and the mobile terminal 10.

In step S3, the distance measurement control unit 113 starts the distance measurement repeat; processing and causes the distance measuring unit 112 to measure a vehicle-terminal distance M (see FIG. 1). The distance measuring unit 112 measures the vehicle-terminal distance M by performing UWB communication with the mobile terminal 10 and saves the measurement data in the memory 120. By the loop in the subsequent step S4 to step S11 in FIG. 4, the distance measurement repeat processing in which the measurement of the vehicle-terminal distance M is executed by the distance measuring unit 312 is executed at predetermined sampling times (corresponding to predetermined time intervals of the present invention).

In step S4, the distance measurement control unit 113 waits for passage of the sampling time and then advances the processing to step S5. In step S5, the distance measurement control unit 113 determines whether the communication with the mobile terminal 10 by BLE has been disconnected or not, and, if the communication has been disconnected, advances the processing to S20 in FIG. 4 where the distance measurement repeat processing is finished. On the other hand, if the communication has not been disconnected, the distance measurement control unit 113 advances the processing to step S6 where the distance measurement repeat processing is continued.

In step S6, the distance measuring unit 112 performs UWB communication with the mobile terminal 10, measures the vehicle-terminal distance M and saves the measurement data in the memory 120. The distance measuring unit 112 saves in the memory 120 the measurement data of the vehicle-terminal distances M for a predetermined period of time when the latest measurements are performed or the measurement data of a predetermined number of vehicle-terminal distances M. The processing from the next step S7 to step S11 in FIG. 4 is processing by the distance measurement continuation determining unit 114.

The distance measurement continuation determining unit 114 in step 7 calculates a change amount $\Delta M$ ($=M2-M1$) of a vehicle-terminal distance M2 measured at the current sampling time with respect to a vehicle-terminal distance M1 measured at the last sampling time. The change amount $\Delta M$ may be calculated by using the measurement values of three or more vehicle-terminal distances M measured at three or more sampling times.

In step S8 in FIG. 4, the distance measurement, continuation determining unit 114 determines whether the change amount $\Delta M$ of the vehicle-terminal distance M is equal to or higher than the first predetermined value or not. If the change amount $\Delta M$ of the vehicle-terminal distance M is equal to or higher than the first predetermined value, the distance measurement continuation determining unit 114 advances the processing to step S20 where the distance measurement repeat processing by the distance measurement control unit 113 is finished. On the other hand, if the change amount $\Delta M$ of the vehicle-terminal distance M is lower than the first predetermined value, the distance measurement continuation determining unit 114 advances the processing to step S9.

In step S9, the distance measurement continuation determining unit 114 determines whether the absolute value of the change amount $\Delta M$ of the vehicle-terminal distance M is equal to or lower than the second predetermined value or not. If the absolute value of the change amount ΔM of the vehicle-terminal distance M is equal to or lower than the second predetermined value, the distance measurement continuation determining unit 114 advances the processing to step S20 where the distance measurement repeat processing by the distance measurement control unit 113 is finished. On the other hand, if the absolute value of the change amount ΔM of the vehicle-terminal distance M is higher than the second predetermined value, the distance measurement continuation determining unit 114 advances the processing to step S10.

In step S10, the battery remaining-amount recognizing unit 115 recognizes the remaining amount of the battery 160. In the subsequent step S11, the distance measurement continuation determining unit 114 determines whether the remaining amount of the battery 160 is equal to or lower than a predetermined remaining amount. If the remaining amount of the battery 160 is equal to or lower than the predetermined remaining amount, the distance measurement continuation determining unit 114 advances the processing to step S20 where the distance measurement repeat processing by the distance measurement control unit 113 is finished. On the other hand, if the remaining amount of the battery 160 is higher than the predetermined remaining amount, the distance measurement continuation determining unit 114 advances the processing to step S4 in FIG. 3 where, in this case, the distance measurement repeat processing by the distance measurement control unit 113 is continued.

If at least any one of the first to third predetermined conditions is satisfied in the processing by the flowcharts in FIGS. 3 and 4, the distance measurement repeat processing is finished. Thus, the power consumption of the battery 160 can be reduced more than a case where the measurements of the vehicle-terminal distances M by UWB communication are unconditionally performed by the distance measuring unit 112 when communication by BLE is established between the first vehicle communication unit 130 in the vehicle 100 and the mobile terminal 10.

4. Other Embodiments

Although, in the embodiment above, the distance measurement continuation determining unit 114 determines whether the distance measurement repeat processing by the distance measurement control unit 113 is to be continued or not based on satisfaction of the first to third predetermined conditions, satisfaction of any one or two of the first to third predetermined conditions may be determined. Whether the distance measurement repeat processing by the distance measurement control unit 113 is to be continued or not may be determined based on a predetermined condition other than the first to third predetermined conditions.

Although, in the embodiment above, the distance measurement control unit 113 causes the distance measuring unit 112 to measure the vehicle-terminal distance M in step S6 every time a predetermined sampling time has passed in step S4 in FIG. 3, the sampling time may be varied. For example, the sampling time may be reduced as the vehicle-terminal distance M decreases.

Although, in the embodiment above, the distance measuring unit 112 measures the vehicle-terminal distance M by performing UWB communication between the second vehicle communication unit 140 and the mobile terminal 10, the vehicle-terminal distance M may be measured by other measurement methods.

FIGS. 1 and 2 are schematic diagrams showing the configurations of the vehicle control system 1 and the vehicle control apparatus (ECU 110) by dividing them based on main processing details for easy understanding of the present invention of the subject application, but the vehicle control system 1 and the vehicle control apparatus may be configured based on other divisions. Processing by the constituent elements may be executed by one hardware unit or may be executed by a plurality of hardware units. The processing by the constituent elements shown in FIGS. 3 and 4 may be executed by one program or may be executed by a plurality of programs.

5. Configuration Supported by Embodiments Above

The embodiments above are specific examples of the following configuration.

(1) A vehicle control apparatus including a vehicle communication control unit performing communication with a mobile terminal used by a user of a vehicle when the mobile terminal positions within an out-vehicle communication area within a predetermined distance from the vehicle, a distance measuring unit, measuring a vehicle-terminal distance, the vehicle-terminal distance being a distance between the vehicle and the mobile terminal, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance measured by the distance measuring unit is satisfied while the distance measurement repeat processing is being executed, finishing execution of the distance measurement repeat processing by the distance measuring unit or increasing intervals of measurements of the vehicle-terminal distance in the distance measurement: repeat processing.

According to the vehicle control apparatus under (1), if a predetermined condition is satisfied when communication between the mobile terminal and the vehicle communication control unit is established and while the distance measurement repeat processing is being executed by the distance measurement control unit, the distance measurement repeat processing is finished or the intervals of the measurements of the vehicle-terminal distance in the distance measurement repeat processing is increased by the distance measurement continuation determining unit. Thus, the power consumption required for measurements of the distances between the vehicle and the terminal can be reduced more than a case where the distance measurement repeat processing is unconditionally continued when the communication between the mobile terminal and the vehicle communication control unit is established.

(2) The vehicle control apparatus under (1), wherein the distance measurement control unit starts the distance measurement repeat processing causing the distance measuring unit to measure the vehicle-terminal distance at predetermined time intervals when communication is established between the mobile terminal and the vehicle communication control unit.

According to the vehicle control apparatus under (2), the distance between the vehicle and the mobile terminal can be quickly measured by starting the distance measurement repeat processing at a time when communication between the vehicle and the mobile terminal is established. The vehicle-terminal distance is measured at predetermined time intervals by the distance measurement repeat processing so that a change in distance between the vehicle and the mobile terminal can be recognized and whether the distance measurement repeat processing is to be continued or not can be determined.

(3) The vehicle control apparatus under (1) or (2), wherein, as the predetermined condition, a first predetermined condition is set, the first predetermined condition being that an increase in distance in a plurality of the vehicle-terminal distances measured by the distance measuring unit at different points in time is equal to or higher than a first predetermined value.

According to the vehicle control apparatus under (3), if it is recognized that the user is moving away from the vehicle based on a fact that the vehicle-terminal distance increases by the first predetermined value or higher, it can be presumed that there is a low possibility that the user uses the vehicle, and the distance measurement repeat processing can be finished or the intervals of the measurements of the vehicle-terminal distance in the distance measurement: repeat processing can be increased.

(4) The vehicle control apparatus under any one of (1) to (3), wherein, as the predetermined condition, a second predetermined condition is set, the second predetermined condition being that a change in distance in a plurality of the vehicle-terminal distances measured by the distance measuring unit at different points in time is equal to or lower than a second predetermined value.

According to the vehicle control apparatus under (4), if a change in the vehicle-terminal distance is equal to or lower than the second predetermined value and it is recognized that the user is not moving, it can be presumed that there is a low possibility that the user uses the vehicle, and the distance measurement repeat processing can be finished or the intervals of the measurements of the vehicle-terminal distance in the distance measurement repeat processing can be increased.

(5) The vehicle control apparatus under any one of (1) to (4), further including a battery remaining-amount recognizing unit recognizing a remaining amount of a battery provided in the vehicle, wherein, as the predetermined condition, a third predetermined condition is set, the third predetermined condition being that the remaining amount of the battery recognized by the battery remaining-amount recognizing unit is equal to or lower than a predetermined amount.

According to the vehicle control apparatus under (5), if the remaining amount of the battery is equal to or lower than the predetermined amount, the distance measurement repeat processing can be finished or the intervals of the measurements of the vehicle-terminal distance in the distance measurement repeat processing can be increased so that a decrease of the battery remaining amount can be reduced.

(6) A vehicle control method to be executed by a vehicle control apparatus performing communication with a mobile terminal used by a user of a vehicle, the method including a vehicle communication control step of performing communication with the mobile terminal when the mobile terminal positions within an out-vehicle communication area within a predetermined distance from the vehicle, a distance measuring step of measuring a vehicle-terminal distance, the vehicle-terminal distance being a distance between the vehicle and the mobile terminal, a distance measurement control step of executing distance measurement repeat processing causing the distance measuring step to repeatedly measure the vehicle-terminal distance when communication between the mobile terminal and the vehicle is established by the vehicle communication control step, and a distance measurement continuation determining step of, if a predetermined condition based on the vehicle-terminal distance measured in the distance measuring step is satisfied while the distance measurement repeat processing is being executed, finishing execution of the distance measurement repeat processing by the distance measuring step or increasing intervals of measurements of the vehicle-terminal distance in the distance measurement repeat processing.

By executing the vehicle control method under (6) by the vehicle control apparatus, the configuration of the vehicle control apparatus under (1) above can be implemented.

(7) A recording medium with a program for control recorded, the program being executed by a vehicle control apparatus performing communication with a mobile terminal used by a user of a vehicle and causing the vehicle control apparatus to function as a vehicle communication control unit performing communication with the mobile terminal when the mobile terminal positions within an out-vehicle communication area within a predetermined distance from the vehicle, a distance measuring unit measuring a vehicle-terminal distance, the vehicle-terminal distance being a distance between the vehicle and the mobile terminal, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance measured by the distance measuring unit is satisfied while the distance measurement repeat processing is being executed, finishing execution of the distance measurement repeat processing by the distance measuring unit or increasing intervals of measurements of the vehicle-terminal distance in the distance measurement repeat processing.

By executing the program for control under (7) by the vehicle control apparatus, the configuration of the vehicle control apparatus under (1) above can be implemented.

(8) A vehicle control system including a vehicle control apparatus having a vehicle communication control unit and a mobile terminal used by a user of a vehicle, wherein the vehicle communication control unit and the mobile terminal perform communication by establishing communication with each other when the mobile terminal positions within an out-vehicle communication area of the vehicle communication control unit, and the vehicle control apparatus includes a distance measuring unit measuring a vehicle-terminal distance, the vehicle-terminal distance being a distance between the vehicle and the mobile terminal, a distance measurement control unit executing distance measurement repeat processing causing the distance measuring unit to repeatedly measure the vehicle-terminal distance when communication between the mobile terminal and the vehicle communication control unit is established, and a distance measurement continuation determining unit, if a predetermined condition based on the vehicle-terminal distance measured by the distance measuring unit is satisfied while the distance measurement repeat processing is being executed, finishing execution of the distance measurement repeat processing by the distance measuring unit or increasing intervals of measurements of the vehicle-terminal distance in the distance measurement repeat processing.

According to the vehicle control system under (8), if a predetermined condition is satisfied when communication between the mobile terminal and the vehicle communication control unit is established and while the distance measurement repeat processing is being executed by the distance measurement control unit, the distance measurement repeat processing is finished or the intervals of the measurements of the vehicle-terminal distance in the distance measurement repeat processing is increased by the distance measurement continuation determining unit. Thus, the power consumption required for measurements of the distances between the vehicle and the terminal can be reduced more than a case where the distance measurement repeat processing is unconditionally continued when the communication between the mobile terminal and the vehicle communication control unit is established.

REFERENCE SIGNS LIST

1: vehicle control system, 10: mobile terminal, 110: ECU (vehicle control apparatus), ill: vehicle communication control unit, 112: distance measuring unit, 113: distance measurement control unit, 114: distance measurement continuation determining unit, 115: battery remaining-amount recognizing unit, 116: vehicle electronic-key control unit, 120: memory, 121: program for control, 130: first vehicle communication unit, 131: BLE antenna, 140: second vehicle communication unit, 141, 142, 143: UWB antenna, 160: battery, U: user

What is claimed is:

1. A vehicle control apparatus comprising:
   a vehicle communication control unit performing communication with a mobile terminal used by a user of a vehicle when the mobile terminal positions within an out-of-vehicle communication area within a predetermined distance from the vehicle;
   a distance measuring unit measuring a vehicle-terminal distance, the vehicle-terminal distance being a distance between the vehicle and the mobile terminal;
   a distance measurement control unit executing distance measurement repeat processing causing the distance measuring unit to repeatedly measure the vehicle-terminal distance when communication between the mobile terminal and the vehicle communication control unit is established; and
   a distance measurement continuation determining unit, wherein, if a predetermined condition based on the vehicle-terminal distance measured by the distance measuring unit is satisfied while the distance measurement repeat processing is being executed, execution of the distance measurement repeat processing by the distance measuring unit is finished or intervals of measurements of the vehicle-terminal distance in the distance measurement repeat processing are increased.

2. The vehicle control apparatus according to claim 1, wherein the distance measurement control unit starts the distance measurement repeat processing causing the distance measuring unit to measure the vehicle-terminal distance at predetermined time intervals when communication is established between the mobile terminal and the vehicle communication control unit.

3. The vehicle control apparatus according to claim 1, wherein, as the predetermined condition, a first predetermined condition is set, the first predetermined condition being that an increase in distance in a plurality of the vehicle-terminal distances measured by the distance measuring unit at different points in time is equal to or higher than a first predetermined value.

4. The vehicle control apparatus according to claim 1, wherein, as the predetermined condition, a second predetermined condition is set, the second predetermined condition being that a change in distance in a plurality of the vehicle-terminal distances measured by the distance measuring unit at different points in time is equal to or lower than a second predetermined value.

5. The vehicle control apparatus according to claim 1, further comprising:
   a battery remaining-amount recognizing unit recognizing a remaining amount of a battery provided in the vehicle,
   wherein, as the predetermined condition, a third predetermined condition is set, the third predetermined condition being that the remaining amount of the battery recognized by the battery remaining-amount recognizing unit is equal to or lower than a predetermined amount.

6. A vehicle control method to be executed by a vehicle control apparatus performing communication with a mobile terminal used by a user of a vehicle, the method comprising:
   a vehicle communication control step of performing communication with the mobile terminal when the mobile terminal positions within an out-of-vehicle communication area within a predetermined distance from the vehicle;
   a distance measuring step of measuring a vehicle-terminal distance, the vehicle-terminal distance being a distance between the vehicle and the mobile terminal;
   a distance measurement control step of executing distance measurement repeat processing causing the distance measuring step to repeatedly measure the vehicle-terminal distance when communication between the mobile terminal and the vehicle is established by the vehicle communication control step; and
   a distance measurement continuation determining step of, if a predetermined condition based on the vehicle-terminal distance measured in the distance measuring step is satisfied while the distance measurement repeat processing is being executed, finishing execution of the distance measurement repeat processing by the distance measuring step or increasing intervals of measurements of the vehicle-terminal distance in the distance measurement repeat processing.

7. A non-transitory recording medium with a program for control recorded, the program being executed by a vehicle control apparatus performing communication with a mobile terminal used by a user of a vehicle and causing the vehicle control apparatus to function as:
   a vehicle communication control unit performing communication with the mobile terminal when the mobile terminal positions within an out-of-vehicle communication area within a predetermined distance from the vehicle;
   a distance measuring unit measuring a vehicle-terminal distance, the vehicle-terminal distance being a distance between the vehicle and the mobile terminal;
   a distance measurement control unit executing distance measurement repeat processing causing the distance measuring unit to repeatedly measure the vehicle-terminal distance when communication between the mobile terminal and the vehicle communication control unit is established; and
   a distance measurement continuation determining unit, wherein, if a predetermined condition based on the vehicle-terminal distance measured by the distance measuring unit is satisfied while the distance measurement repeat processing is being executed, execution of the distance measurement repeat processing by the distance measuring unit is finished or intervals of measurements of the vehicle-terminal distance in the distance measurement repeat processing are increased.

8. A vehicle control system comprising a vehicle control apparatus having a vehicle communication control unit and a mobile terminal used by a user of a vehicle, wherein the vehicle communication control unit and the mobile terminal perform communication by establishing communication with each other when the mobile terminal positions within an out-of-vehicle communication area of the vehicle communication control unit, and the vehicle control apparatus includes:

a distance measuring unit measuring a vehicle-terminal distance, the vehicle-terminal distance being a distance between the vehicle and the mobile terminal;

a distance measurement control unit executing distance measurement repeat processing causing the distance measuring unit to repeatedly measure the vehicle-terminal distance while communication between the mobile terminal and the vehicle communication control unit is established; and a distance measurement continuation determining unit, wherein, if a predetermined condition based on the vehicle-terminal distance measured by the distance measuring unit is satisfied while the distance measurement repeat processing is being executed, execution of the distance measurement repeat processing by the distance measuring unit is finished or intervals of measurements of the vehicle-terminal distance in the distance measurement repeat processing are increased.

* * * * *